United States Patent
Tilford et al.

(10) Patent No.: US 7,333,965 B2
(45) Date of Patent: Feb. 19, 2008

(54) CLASSIFYING TEXT IN A CODE EDITOR USING MULTIPLE CLASSIFIERS

(75) Inventors: John S. Tilford, Seattle, WA (US); Randy S. Kimmerly, Woodinville, WA (US); Vijaye G. Raji, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 10 days.

(21) Appl. No.: 11/360,125

(22) Filed: Feb. 23, 2006

(65) Prior Publication Data

US 2007/0198447 A1  Aug. 23, 2007

(51) Int. Cl.
*G06N 5/00* (2006.01)

(52) U.S. Cl. .................... 706/20; 706/45; 382/100; 380/252

(58) Field of Classification Search ................. 706/20, 706/11, 45; 708/525; 716/16; 382/100; 380/252
See application file for complete search history.

(56) References Cited

U.S. PATENT DOCUMENTS

| | | | |
|---|---|---|---|
| 5,371,807 A | 12/1994 | Register et al. | 382/14 |
| 6,038,527 A | 3/2000 | Renz | 704/9 |
| 6,192,360 B1 | 2/2001 | Dumais et al. | 707/6 |
| 6,266,430 B1 * | 7/2001 | Rhoads | 382/100 |
| 6,330,335 B1 * | 12/2001 | Rhoads | 380/252 |
| 6,343,138 B1 * | 1/2002 | Rhoads | 382/100 |
| 6,701,338 B2 * | 3/2004 | Narad et al. | 708/525 |
| 6,754,881 B2 * | 6/2004 | Kuhlmann et al. | 716/16 |
| 6,798,912 B2 | 9/2004 | Devara | 382/229 |
| 6,850,920 B2 * | 2/2005 | Vetter | 706/11 |
| 2003/0101181 A1 | 5/2003 | Al-Kofahi et al. | 707/7 |
| 2003/0172357 A1 | 9/2003 | Kao et al. | 715/529 |
| 2004/0049498 A1 | 3/2004 | Dehlinger et al. | 707/3 |
| 2005/0257192 A1 | 11/2005 | Chelle et al. | 717/108 |
| 2005/0262039 A1 | 11/2005 | Kreulen et al. | 707/1 |

OTHER PUBLICATIONS

Accumo Classifier Overview, *Accumo*, 2004, http://www.acuumo.com/product.html, 1 page.
CodeColorizer, 1995-2003, http://www.chami.com/colorizer/, 2 pages.
D'Andrea, F., et al., "Nautilus a diagrammatic specification and programming language," no date available, http://www.inf.ufrges.br/~teia/congr_comp/pdes2002.pdf, 6 pages.
GeSHi—Generic Syntax Highlighter, 2004, http://qbnz.com/highlighter/, 4 pages.
U.S. Appl. No. 11/304,204, filed Dec. 14, 2005, Kimmerly, R.S.
U.S. Appl. No. 60/716,443, filed Sep. 13, 2005, Kimmerly, R.S.

* cited by examiner

*Primary Examiner*—Wilbert L Starks, Jr.
(74) *Attorney, Agent, or Firm*—Woodcock Washburn LLP

(57) ABSTRACT

Multiple independent classifiers of a code editor are used to classify a range of text. Each classifier is an independent classifier and can independently classify any given range of text. Classifiers can be added and merged during run time of the code editor. Adding a classifier does not require modification of any existing classifiers in the code editor. Text can be classified and formatted in accordance with any number of classifiers in the aggregate. The user of the code editor can initiate classification. The user of the code editor can select text for user specific formatting.

16 Claims, 5 Drawing Sheets

| Line Number | |
|---|---|
| 1 | /// <summary> |
| 2 | /// Inserts the given text in the specified position. |
| 3 | /// Throws ArgumentOutOfRangeException if position is negative or greater than the length |
| 4 | /// of the buffer. |
| 5 | /// Throws ArgumentNullException if text is null. |
| 6 | /// </summary> |
| 7 | /// <param name="position"> |
| 8 | /// The point of insertion of text |
| 9 | /// </param> |
| 10 | /// <param name="text"> |
| 11 | /// The text to insert |
| 12 | /// </param> |
| 13 | public abstract void Insert ( int position , string text ); |

Line Number

1  /// <summary>
2  /// Inserts the given text in the specified position.
3  /// Throws ArgumentOutOfRangeException *if position is negative or greater than the length*
4  /// *of the buffer.*
5  /// Throws ArgumentNullException *if text is null.*
6  /// </summary>
7  /// <param name="position">
8  /// The point of insertion of text
9  /// </param>
10 /// <param name="text">
11 /// The text to insert
12 /// </param>
13 public   abstract   void   Insert   (int   position   ,   string   text );

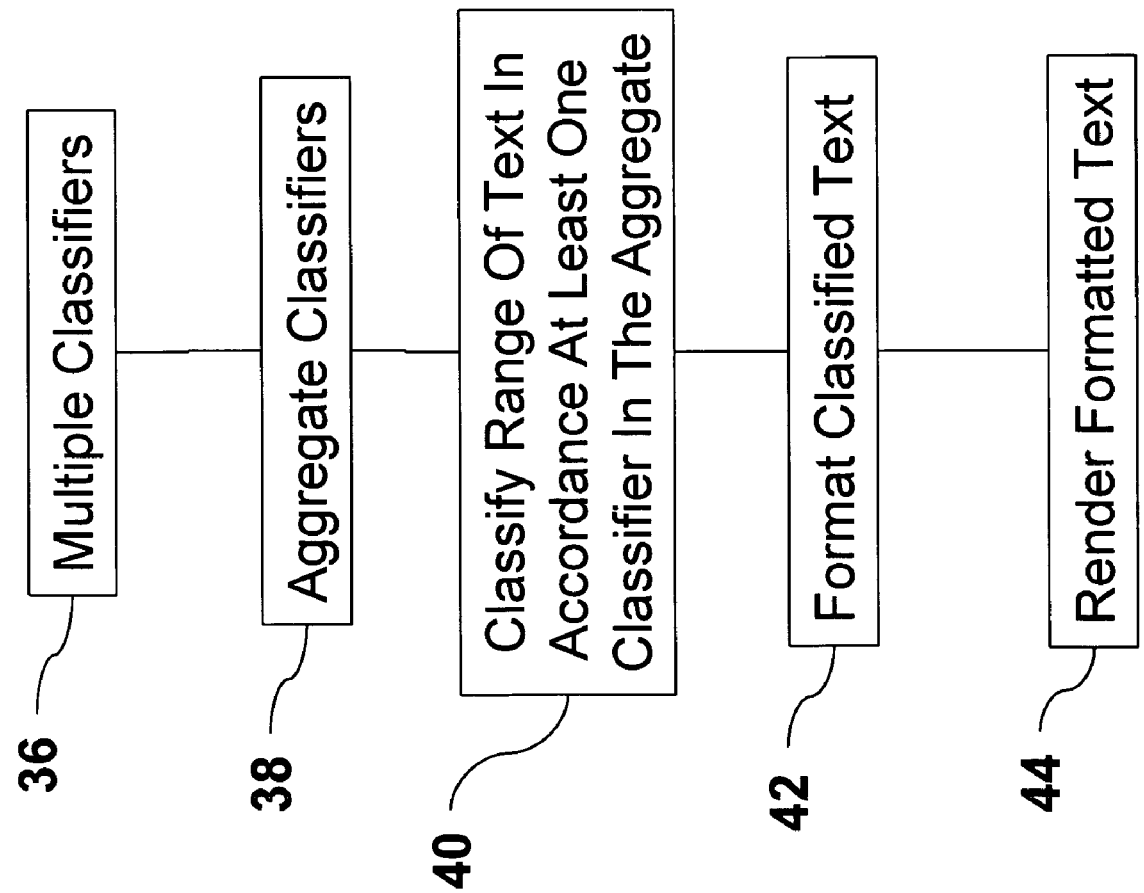

CLASSIFYING TEXT IN A CODE EDITOR USING MULTIPLE CLASSIFIERS

TECHNICAL FIELD

The technical field generally relates to code editors and more specifically to classifying text in a code editor.

BACKGROUND

Many code editors, such as source code editors and text editors, provide formatting of text in accordance with syntax (e.g., grammar) or semantics (e.g., meaning). For example, a code editor could render comments in italics and code in bold font. Text is classified as having a specific display characteristic or format, and each text run has associated therewith the specific classification for the text. As described herein a text run comprises a sequence of text characters each of which has the same formatting properties (for example, font family and color). Classifiers are typically bundled together such that adding or modifying a classification requires modification of existing classifiers. Thus, if a user desires to add additional classification logic to the code editor, the user must add the classification logic and recompile the code editor. This process can be burdensome, time consuming, and inefficient.

SUMMARY

This Summary is provided to introduce a selection of concepts in a simplified form that are further described below in the Detailed Description Of The Illustrative Embodiments. This Summary is not intended to identify key features or essential features of the claimed subject matter, nor is it intended to be used to limit the scope of the claimed subject matter.

Multiple independent classifiers of a code editor can be used to classify a range of text. Classifiers can be added during run time of the code editor. Adding a classifier does not require modification of any existing classifiers in the code editor. Classifiers are aggregated during run time of the code editor. Text can be classified in accordance with any number of classifiers in the aggregate. The user of the code editor can initiate classification. The user of the code editor can select text for user specific formatting. In an exemplary embodiment, the aggregate of classifiers is implemented as a service having multiple producers, wherein each producer is capable of independently classifying the same range of text.

BRIEF DESCRIPTION OF THE DRAWINGS

The foregoing summary, as well as the following detailed description, is better understood when read in conjunction with the appended drawings. For the purpose of illustrating text classification in a code editor using multiple classifiers, there is shown in the drawings exemplary constructions thereof; however, text classification in a code editor using multiple classifiers is not limited to the specific methods and instrumentalities disclosed. In the drawings:

FIG. 2 is an exemplary illustration of text classified and formatted in accordance with a two classifiers;

FIG. 3 is an exemplary illustration of text classified and formatted in accordance with a third classifier;

FIG. 5 is a flow diagram for an exemplary process for classifying text in a code editor with multiple classifiers.

DETAILED DESCRIPTION OF ILLUSTRATIVE EMBODIMENTS

As described herein, classification logic can be added to a code editor at run-time without modifying any existing classifiers. Thus, a particular range of text, or portion thereof, can be classified by multiple classifiers. The classifications are merged, or aggregated, to render that range of text on a display via the code editor. For example, a first classifier, Classifier A, can classify a range of text as comment in a programming language. A second classifier, Classifier B, subsequently can be added. As classified by Classifier B, the same range of text can be classified as document comment, which is a specialized kind of comment, and further classify sub-ranges of text inside the document comment. Subsequently, a third classifier, Classifier C, can be added, classifying some words in the same range of text as requiring emphasis. The three classifiers, Classifier A, Classifier B, and Classifier C are merged (aggregated) by a classification aggregator during run time of the code editor. The range of text can now be rendered in accordance with the three classification formats. That is the range of text is a comment (meaning it should be italicized and rendered in a particular color), is further a document comment (meaning its substructure should be indicated by further use of color), and a subset of it requires emphasis (meaning it should be rendered in a bold font).

Figure 1:
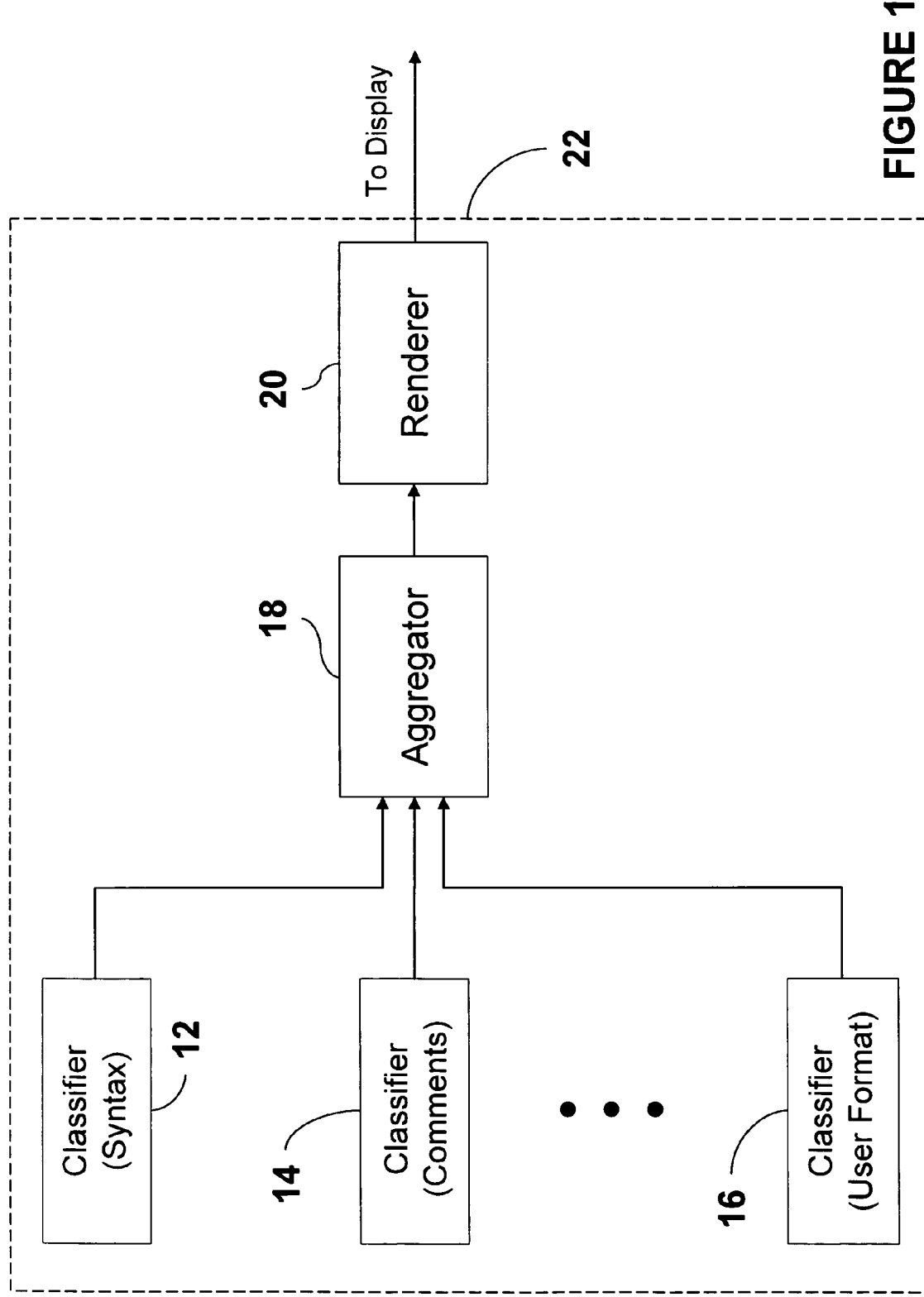
FIG. 1 is a functional block diagram of an exemplary system for classifying text in a code editor using multiple classifiers.

FIG. 1 is a functional block diagram of an exemplary system for classifying text in a code editor using multiple classifiers. Code editor 22 comprises functional components for classifying text (e.g., classifiers 12, 14, 16), aggregating classifications (e.g., aggregator 18), and rendering text (e.g., rendered 20) formatted in accordance with the aggregated classifications. Any number of classifiers can be aggregated. Classifiers can be added, deleted, and/or modified, without requiring other classifiers to be modified. Classifiers can be added, deleted, and/or modified during run time of the code editor 22. Classifiers can include any appropriate type of classifier. For example, classifiers can include syntax classifiers, semantic classifiers, documents comments classifiers, user designated format classifiers, or a combination thereof. As depicted in FIG. 1, exemplary classifiers include syntax classifier 12, document comment classifier 14, and user format classifier 16.

A classifier can classify text in a code editor into one of any number and type of classifications. For example, a syntax classifier can operate on source code to classify ranges of text as keywords, identifiers, comments, strings, or the like. FIG. 2 is an exemplary illustration of text classified and formatted in accordance with a two classifiers. Text rendered in display area 24 comprises several lines of source code including comments. Text rendered in display area 24 represents text being rendered via a code editor (e.g., code editor 22). Individual lines are numbered 1 through 13. Lines 1 through 13 represent a range of text that has been classified and formatted in accordance with two classifiers: (1) a syntax classifier that has classified text into comments, keywords, and identifiers, and (2) a comments classifier that has subsequently classified text into document comment tags.

The first classifier classified text in the range of text rendered in display area 24 as one of comment, keyword, or identifier. Text preceded by diagonal lines ("///") represents comments. The syntax classifier, recognizing that lines 1 through 12 represent comments, classified the text as such. Text in lines 1 through 12 is rendered in italics and colored dark gray. Note that color is not evident in the black and white version of FIG. 2 provided herein. Line 13 contains text representing identifiers and keywords. The terms "public," "abstract," "void," "int," and "string" are keywords. The classifier recognizes terms "public," "abstract," "void," "int," and "string" as keywords. Terms "public," "abstract," "void," "int," and "string" are rendered in non-italic font and colored blue. Terms "insert," "position," and "text" are identifiers. The classifier recognizes terms "insert," "position," and "text" as identifiers. Terms "insert," "position," and "text" are rendered in non-italic font and colored black.

Another classifier subsequently operates on the range of text rendered in display area 24. The second classifier was added during run time of the code editor. The second classifier is a document comments classifier that recognizes and formats document comments. The second classifier operates on the same range of text (rendered in display area 24) as the first classifier operated on. Accordingly, text is rendered in display area 24 formatted in accordance with both classifiers. The document comments classifier further recognizes text proceeded by diagonal lines ("///") and within angle brackets ("<>") as document comments. The document comments classifier also recognizes that text with quotation marks ("") within angle brackets is not a comment. In accordance with the documents classifier, text indicative of document comments is colored green. Thus, as depicted in FIG. 2, text in lines 1, 6, 9, and 11 is colored green. Text in lines 7 and 10, except for text with quotes, is also colored green. Note that all diagonal lines ("///") are also colored green. It is emphasized that the formatting of text as depicted in FIG. 2 is exemplary. Any appropriate format can be used to indicate a classification of text.

FIG. 3 is an exemplary illustration of text classified and formatted in accordance with a third classifier. The third classifier was added during run time of the code editor. The third classifier operates on the same range of text (rendered in display area 24) as the first and second classifiers operated on. Accordingly, text is rendered in display area 24, formatted in accordance with three classifiers. The third classifier understands user commands. The third classifier receives user input and accordingly formats text selected by the user. For example, a user can select text in display area 24 and the selected text is emphasized. As depicted in FIG. 3, the user selected the term "ArgumentOutOfRangeException" and the term "ArgumentNullException" in lines 3 and 5, respectively. The selected text is formatted in bold font and colored black, as depicted in FIG. 3.

Any number of classifiers can be added during run time of the code editor. Any number of classifiers can be aggregated during run time of the code editor. Each classifier is independent. A classifier can independently classify any given range of text. Classifiers can be added, modified, and/or deleted without perturbing other classifiers. The resultant rendered text is formatted in accordance each classifier. The code editor does not have to be recompiled to add, delete, and/or modify a classifier.

Figure 4:
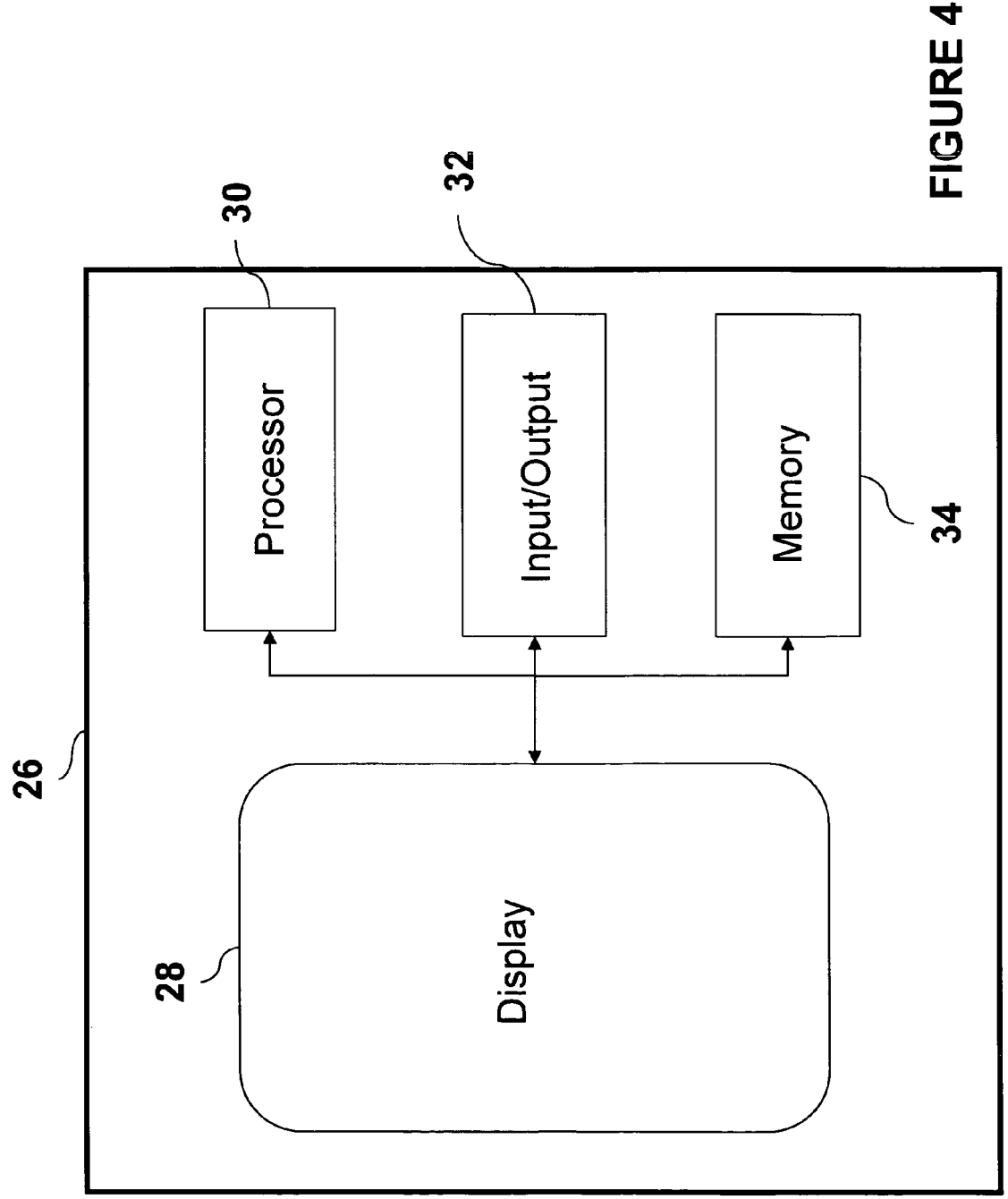
FIG. 4 is a diagram of an exemplary computing device for classifying text in a code editor using multiple classifiers.

FIG. 4 is a diagram of an exemplary computing device 26 for classifying text in a code editor using multiple classifiers. The computing device 26 comprises a processor portion 30, an input/output portion 32, a memory portion 34, and a display portion 28. In its most basic configuration, computing device 26 includes at least one processing portion 30, and a memory portion 34. Memory portion 34 can be utilized to store classifiers and parameters associated with classifiers, such as text formatting information, for example. Depending upon the exact configuration and type of computing device, the memory portion 34 can comprise volatile memory (such as RAM), non-volatile memory (such as ROM, flash memory, or the like) or some combination thereof. Additionally, the memory portion 34 can comprise additional features/functionality. For example, the memory portion 34 can comprise additional storage (removable and/or non-removable) including, but not limited to, magnetic or optical disks or tape. Computer storage media can include volatile and nonvolatile, removable and non-removable media implemented in any method or technology for storage of information such as computer readable instructions, data structures, program modules or other data. Memory portion 34 represents examples of computer storage media. Computer storage media can include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by the computing device 26. Any such computer storage media can be part of the computing device 26.

The computing device 26 also can contain input/output portion 32 that allows the computing device 26 to communicate with other devices. Input/output portion 32 can comprise communication media. Exemplary communication media embody computer readable instructions, data structures, program modules or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer-readable media as used herein includes both storage media and communication media.

The computing device 26 is capable of executing a code editor, such as a source code editor or a text editor. When a code editor is being executed, text is rendered on the display portion 28. The display portion 28 can comprise any appropriate display device, such as a cathode ray tube (CRT) display device, a plasma display device, a light emitting diode (LED) display device, a liquid crystal display (LCD) device, or a combination thereof. In an exemplary scenario, a user of the code editor wants to visually render text formatted in accordance with multiple classifiers on the display portion 28.

In an exemplary embodiment, processor portion 30 comprises an aggregator for aggregating independent classifiers. Processor portion 30 classifies a range of text (e.g., rendered by display portion 28) in accordance with each classifier. The individual classifiers are aggregated and text formatted in accordance with the aggregation is rendered by display portion 28. Text is rendered on display portion 28, formatted in accordance with the aggregate of the independent classifiers.

FIG. 5 is a flow diagram for an exemplary process for classifying text in a code editor with multiple classifiers. Multiple classifiers are provided at step 36. Classifiers can include any appropriate type of classifier. For example, appropriate types of classifiers include syntax classifiers, semantic classifiers, documents comments classifiers, user designated format classifiers, or a combination thereof. Classifiers can be resident in the code editor and/or a user can develop classifiers to be used with the code editor. Classifiers can be added, deleted, and/or modified during run time of the code editor. Any number of classifiers can be added, deleted, and/or modified. Each classifier is an independent classifier. Each classifier can independently classify any given range of text. Each classifier recognizes text attributes and classifies text in accordance with recognized attributes. Rendered text is formatted in accordance with the classification of the text.

Multiple classifiers are aggregated at step 38. Each classifier of the aggregate can be used separately or in conjunction with other classifiers in the aggregate. A range of text, or a portion thereof, is classified in accordance with at least one classifier in the aggregate at step 40. Any range of text can be classified. Each classifier can classify a different portion of text, each classifier can classify the same portion of text, or any combination thereof. Classified text is formatted at step 42 and the formatted text is rendered at step 44. Text can be formatted and rendered in any appropriate manner. For example, text can be formatted in accordance with color, font, font effect, highlight, a designation as a hyper text link, a user defined format, or a combination thereof.

In an exemplary embodiment, a Nautilus composition model is utilized to realize text classification in a code editor using multiple classifiers. In a Nautilus composition model for large-scale extensible applications, applications are constructed in a modular fashion. The modules integrate with each other by producing and consuming functionality that conforms to a common definition. Producer modules and consumer modules are kept independent of one another, and are linked together indirectly via a definition module. Classifiers are defined as producer modules. Each classifier can independently classify any given range of text. Such classifiers can be added, deleted, and/or modified to the code editor during run time. Added classifiers, added during run time of the code editor, can work with other classifiers previously incorporated into the code editor.

The various techniques described herein can be implemented in connection with hardware or software or, where appropriate, with a combination of both. Thus, the methods and apparatuses for classifying text in a code editor using multiple classifiers or certain aspects or portions thereof, can take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for classifying text in a code editor using multiple classifiers. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language may be a compiled or interpreted language, and combined with hardware implementations.

While methods, apparatuses, and systems for classifying text in a code editor using multiple classifiers have been described in connection with the illustrative embodiments of the various figures, it is to be understood that other similar embodiments can be used or modifications and additions can be made to the described embodiment for performing the same functions without deviating therefrom. Rather, the specific features and acts described above are disclosed as example forms of implementing the claims. Therefore, methods and apparatuses for classifying text in a code editor using multiple classifiers should not be limited to any single embodiment, but rather should be construed in breadth and scope in accordance with the appended claims.

What is claimed is:

1. A method, implemented at least in part on a computing device, for classifying text in a code editor, said method comprising:

providing a plurality of independent classifiers for classifying a range of text in said code editor;

aggregating, during run time of said code editor, said plurality of independent classifiers;

classifying said range of text in said code editor in accordance with at least one classifier of said aggregate of classifiers; and rendering said range of text formatted in accordance with at least one classifier of said aggregate of classifiers, wherein said rendered range of text is formatted in accordance with at least one of color, font, a font effect, highlight, a designation as a hyper text link, and a user defined format.

2. A method in accordance with claim 1, wherein:

a classifier can be added to said aggregate of classifiers during run time of said code editor; and addition of a classifier to said aggregate of classifiers does not require modification of any classifier of said aggregate of classifiers.

3. A method in accordance with claim 1, wherein a user of said code editor initiates classification of said range of text in accordance with at least one classifier of said plurality of classifiers.

4. A method in accordance with claim 3, wherein said act of initiating comprises selecting, by said user, said range of text.

5. A method in accordance with claim 1, wherein said plurality of classifiers comprises at least one of a syntax classifier, a document comments classifier, and a user designated format classifier.

6. A method in accordance with claim 1, wherein said aggregate of classifiers is implemented as a service comprising a plurality of producers, each producer being capable of independently classifying said range of text.

7. A computing device for classifying a range of text in a code editor, said computing device comprising:

a processor portion for:

aggregating, during run time of said code editor, a plurality of independent classifiers of said code editor; and classifying said range of text in said code editor in accordance with at least one classifier of said aggregate of classifiers; and a display portion for rendering said range of text formatted in accordance with at least one classifier of said aggregate of classifiers, wherein said rendered range of text is formatted in accordance with at least one of color, font, a font effect, highlight, a designation as a hyper text link, and a user defined format.

8. A computing device in accordance with claim 7, wherein:

a classifier can be added to said aggregate of classifiers during run time of said code editor; and addition of a classifier to said aggregate of classifiers does not require modification of any classifier of said aggregate of classifiers.

9. A computing device in accordance with claim 7, wherein a user of said code editor initiates classification of said range of text in accordance with at least one classifier of said plurality of classifiers.

10. A computing device in accordance with claim 9, wherein said user initiates classification by selecting said range of text.

11. A computing device in accordance with claim 7, wherein said plurality of classifiers comprises at least one of a syntax classifier, a document comments classifier, and a user designated format classifier.

12. A computing device in accordance with claim 7, wherein said aggregate of classifiers is implemented as a service comprising a plurality of producers, each producer being capable of independently classifying said range of text.

13. A computer-readable medium having computer-executable instructions stored thereon, said computer-executable instructions for performing the acts of:
    aggregating, during run time of a code editor, a plurality of independent classifiers of said code editor; and
    classifying a range of text in said code editor in accordance with at least one classifier of said aggregate of classifiers; and
    rendering said range of text formatted in accordance with at least one classifier of said aggregate of classifiers, wherein said rendered range of text is formatted in accordance with at least one of color, font, a font effect, highlight, a designation as a hyper text link, and a user defined format.

14. A computer-readable medium in accordance with claim 13, wherein:
    a classifier can be added to said aggregate of classifiers during run time of said code editor; and
    addition of a classifier to said aggregate of classifiers does not require modification of any classifier of said aggregate of classifiers.

15. A computer-readable medium in accordance with claim 13, wherein said plurality of classifiers comprises at least one of a syntax classifier, a document comment classifier, and a user designated format classifier.

16. A computer-readable medium in accordance with claim 13, wherein said aggregate of classifiers is implemented as a service comprising a plurality of producers, each producer being capable of independently classifying said range of text.

* * * * *